(12) United States Patent
Huang et al.

(10) Patent No.: US 11,188,462 B2
(45) Date of Patent: Nov. 30, 2021

(54) METHOD, DEVICE, AND COMPUTER PROGRAM PRODUCT FOR MANAGING ADDRESS MAPPING IN STORAGE SYSTEM

(71) Applicant: EMC IP Holding Company LLC, Hopkinton, MA (US)

(72) Inventors: Frank Yifan Huang, Shanghai (CN); Chaoqian Cai, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/805,533

(22) Filed: Feb. 28, 2020

(65) Prior Publication Data

US 2021/0073123 A1    Mar. 11, 2021

(30) Foreign Application Priority Data

Sep. 11, 2019   (CN) .......................... 201910860170.X

(51) Int. Cl.
*G06F 12/06*    (2006.01)
(52) U.S. Cl.
CPC ...... *G06F 12/063* (2013.01); *G06F 2212/206* (2013.01)
(58) Field of Classification Search
CPC .............. G06F 12/203; G06F 12/0646; G06F 12/0653; G06F 3/067; G06F 3/0683;
(Continued)

(56) References Cited

U.S. PATENT DOCUMENTS 10,540,207 B1 *   1/2020   Lorenz .................. G06F 9/5061
10,657,061 B1 *   5/2020   Marriner ............. H04L 41/0806
(Continued)

OTHER PUBLICATIONS

Karger, D., Lehman, E., Leighton, T., Levine, M., Lewin, D., and R. Panigraphy, "Consistent Hashing and Random Trees: Distributed Caching Protocols for Relieving Hot Spots on the World Wide Web," Proceedings of the twenty-ninth annual ACM symposium on Theory of computing, 1997.*

(Continued)

*Primary Examiner* — Tracy A Warren
(74) *Attorney, Agent, or Firm* — Amin, Turocy & Watson, LLP

(57) ABSTRACT

The present disclosure relates to a method, device and computer program product for managing an address mapping of a storage system. A group of data objects in the storage system are mapped to a group of buckets in the address mapping, the group of buckets being divided into a first group of active shards which are associated with a group of storage devices in the storage system, respectively. In the method, a first write request for writing a first data object to the storage system is received. The address mapping is updated so as to map the first data object to a first bucket in the group of buckets. The storage system is instructed to store the first data object to a first storage device in the group of storage devices, and the first storage device is associated with a first active shard to which the first bucket belongs. The storage system is managed based on the updated address mapping. With the above example implementation, the address mapping in the storage system may be managed with higher efficiency, and further the overall response speed of the storage system may be improved. There is also provided a corresponding device and computer program product.

20 Claims, 8 Drawing Sheets

(58) Field of Classification Search
CPC ........ G06F 3/064; G06F 3/0644; G06F 3/061;
G06F 3/0611; G06F 2212/206
See application file for complete search history.

(56) References Cited

U.S. PATENT DOCUMENTS

| | | | |
|---|---|---|---|
| 2015/0186187 A1* | 7/2015 | Weisberg | G06F 16/278 |
| | | | 707/747 |
| 2017/0177266 A1* | 6/2017 | Doerner | G06F 12/0261 |
| 2019/0147066 A1* | 5/2019 | Ben Dayan | G06F 16/13 |
| | | | 711/100 |
| 2019/0303486 A1* | 10/2019 | Zhuge | G06F 16/278 |
| 2020/0133550 A1* | 4/2020 | Willnauer | G06F 3/065 |

OTHER PUBLICATIONS

Lamping, J. and E. Veach, "A Fast, Minimal Memory, Consistent Hash Algorithm," 2014, available: https://arxiv.org/abs/1406.2294.*

K. Fujiii, "An Algorithm for Mapping Data to Storage Clusters," 2016, available: http://www.fjkz.net/notes/jumpbucket.pdf.*

Venkateswaran, N. and S. Changder, "Handling workload skew in a consistent hashing based partitioning implementation," 2017 International Conference on Advances in Computing, Communications and Informatics (ICACCI), 2017.*

Venkateswaran, N. and S. Changder, "Simplified Data Partitioning in a Consistent Hashing Based Sharding Implementation," Proc. of the 2017 IEEE Region 10 Conference (TENCOM), 2017.*

* cited by examiner

METHOD, DEVICE, AND COMPUTER PROGRAM PRODUCT FOR MANAGING ADDRESS MAPPING IN STORAGE SYSTEM

RELATED APPLICATION

The present application claims the benefit of priority to Chinese Patent Application No. 201910860170.X, filed on Sep. 11, 2019, which application is hereby incorporated into the present application by reference herein in its entirety.

FIELD

Various implementations of the present disclosure relate to the management of storage systems, and more specifically, to a method, device and computer program product for managing an address mapping in a storage system.

BACKGROUND

With the development of data storage technology, various data storage devices now provide users with increasingly large data storage capacities. The concept of distributed storage system has been introduced, and user data may be distributed over various nodes in a distributed storage system. Further, as the data storage capacity increases, users put forward higher demands on the response time of a storage system. So far a technical solution has been developed for accelerating data access speed by building an index for address mapping of data objects stored in a storage system.

For example, storage space in the storage system may be divided into a plurality of shards using sharding technology. The plurality of shards may perform operations such as data writes/reads in parallel, thereby improving the performance of the storage system. With the increase of the amount of data in the storage system, the amount of data which involve shards also increases and will make managing the work more arduous. At this point, it has become a focus of research regarding how to manage address mapping and improve the performance of a storage system more effectively.

SUMMARY

Therefore, it is desirable to develop and implement a technical solution for managing an address mapping in a storage system more effectively. It is desired that the technical solution be compatible with an existing storage system to manage a storage system more effectively by reconstructing configurations of the existing application system.

According to a first aspect of the present disclosure, there is provided a method for managing an address mapping of a storage system. A group of data objects in the storage system are mapped to a group of buckets in the address mapping, the group of buckets being divided into a first group of active shards which are associated with a group of storage devices in the storage system, respectively. In the method, a first write request for writing a first data object to the storage system is received. The address mapping is updated so as to map the first data object to a first bucket in the group of buckets. The storage system is instructed to store the first data object to a first storage device in the group of storage devices, the first storage device being associated with a first active shard to which the first bucket belongs. The storage system is managed based on the updated address mapping.

According to a second aspect of the present disclosure, there is provided a device for managing an address mapping of a storage system, a group of data objects in the storage system being mapped to a group of buckets in the address mapping, the group of buckets being divided into a first group of active shards which are associated with a group of storage devices in the storage system, respectively. The device comprises: at least one processor; a volatile memory; and a memory coupled to the at least one processor, the memory having instructions stored thereon, the instructions, when executed by the at least one processor, causing the device to perform acts. The acts include: receiving a first write request for writing a first data object to the storage system; updating the address mapping so as to map the first data object to a first bucket in the group of buckets; instructing the storage system to store the first data object to a first storage device in the group of storage devices, the first storage device being associated with a first active shard to which the first bucket belongs; and managing the storage system based on the updated address mapping.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations, the present disclosure will become more apparent. Several implementations of the present disclosure are illustrated schematically and are not intended to limit the present embodiments. In the drawings.

DETAILED DESCRIPTION OF IMPLEMENTATIONS

The various implementations of the present disclosure will be described in more detail with reference to the drawings. Although the drawings illustrate the various implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
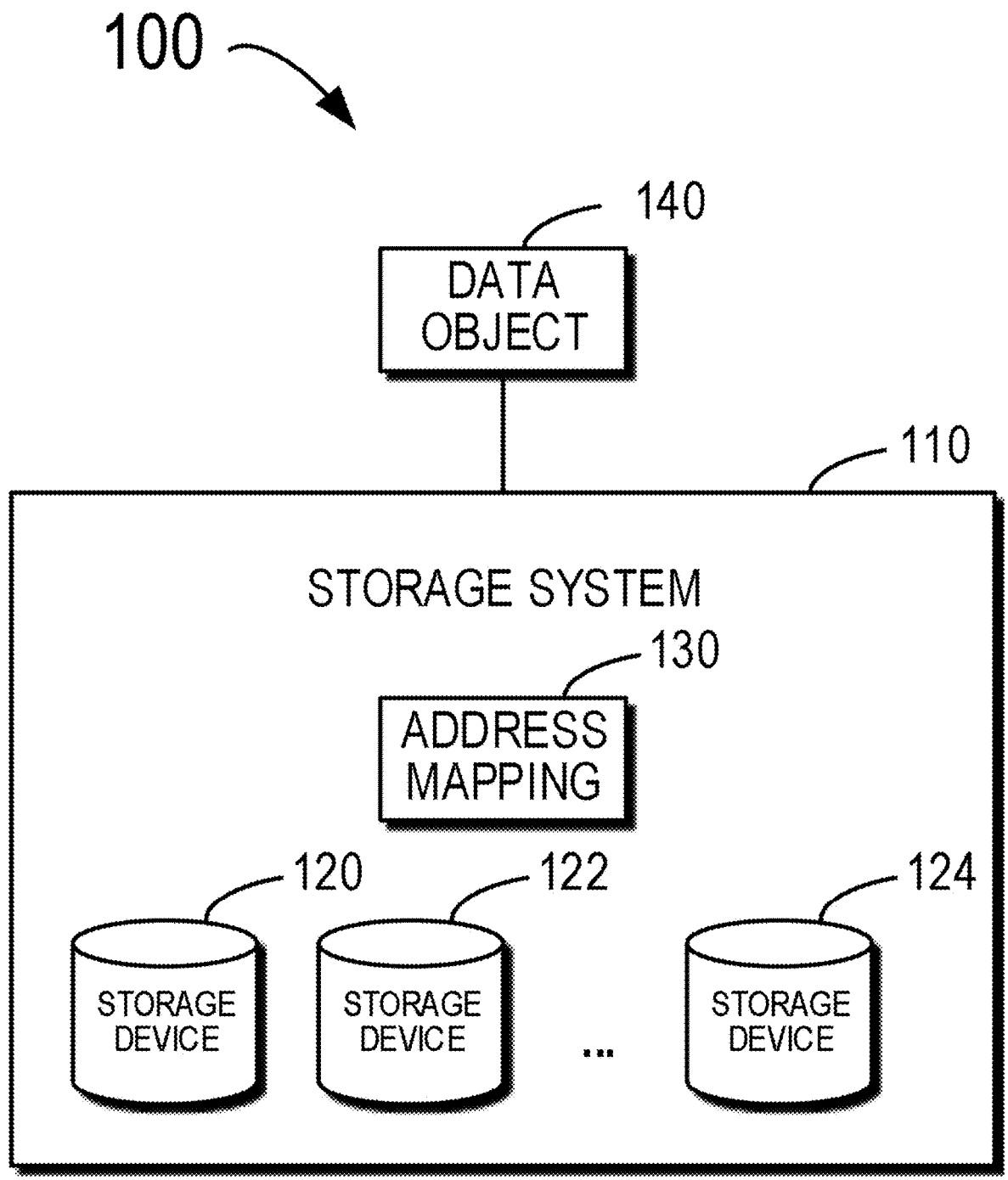
FIG. 1 schematically shows a block diagram of a storage system in which a method of the present disclosure may be implemented.

A variety of storage systems have been developed. For example, a distributed storage system may comprise a plurality of storage devices, and a data object from a user may be stored to a storage device among the plurality of storage devices based on address mapping. FIG. 1 schematically shows a block diagram 100 of a storage system in which a method of the present disclosure may be implemented. As depicted, a storage system 100 may comprise a plurality of storage devices 120, 122, . . . , and 124. Further, the storage system 110 may comprise address mapping 130, which may map a data object 140 from a user to one or more storage devices.

It will be understood the data object 140 here may take different types. For example, the data object 140 may be a video file, an audio file, a text file, etc. Further, the data object 140 may have different sizes. If the data object 140 is larger (e.g., a high-definition movie), then the data object 140 may be divided into a plurality of smaller blocks, and these blocks may be stored to a plurality of storage devices in the storage system 110, respectively. At this point, the address mapping 130 may record mapping relations between the data object 140 and one or more blocks of the data object 140. In other words, the address mapping 130 needs to record storage device(s) in the storage system 110 to which each block of the data object 140 is stored, and also needs to record the address(es) of the storage device(s).

Figure 2:
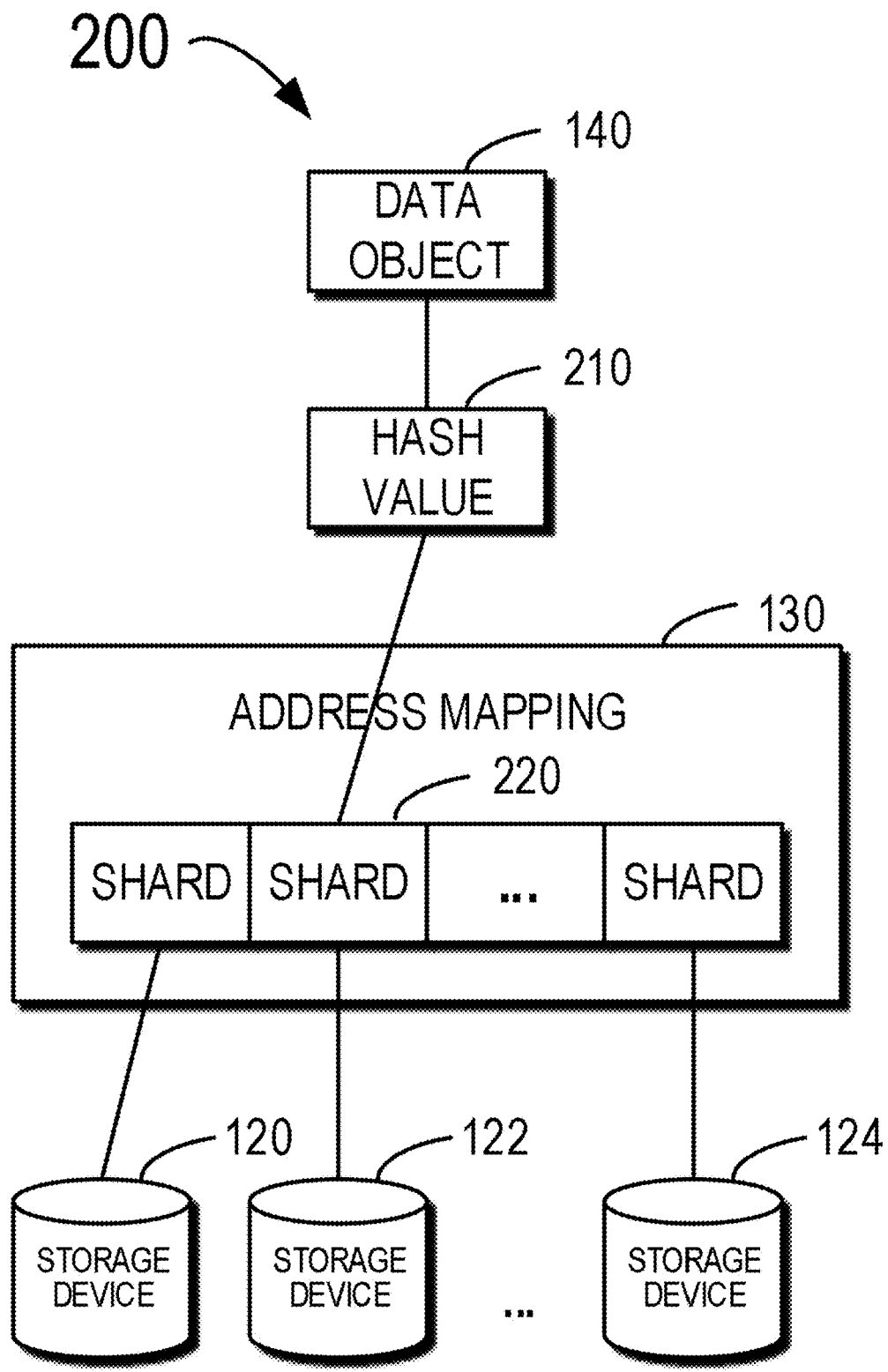
FIG. 2 schematically shows a block diagram of an address mapping of a storage system according to one technical solution.

For the sake of management, sharding technology has been proposed. FIG. 2 schematically shows a block diagram 200 of address mapping for a storage system according to one technical solution. As depicted, a hash value of the data object 140 may be obtained based on the data object. The address mapping 130 may comprise a plurality of shards. Here, the number of shards may depend on the number of storage devices in the storage system 110. For example, the number of shards may be proportional to the number of storage devices, and a maximum may be set for the number of shards.

It will be understood although FIG. 2 illustrates the case in which one shard corresponds to one storage device, in other examples one shard may correspond to one or more storage devices in the storage system 110. In a further example, a many-to-many relation may exist between shards and storage devices. As shown in FIG. 2, a hash value 210 may be obtained after performing a hash operation to the data object 140 from a user of the storage system 110. Based on the hash value 210, it may be determined the data object 140 corresponds to a shard 220, and subsequently the data object 140 may be stored to a storage device 122 associated with the shard 220.

In order to guarantee a workload balance of the storage system 110, it should be ensured that the plurality of shards have a similar size, and it is desired the access load on a storage device associated with each shard is similar. However, since user access is subject to large fluctuation, and the number of storage devices in the storage system 110 might change, there is a need for a complex algorithm to guarantee the balance of the storage system. At this point, it has become a focus of research regarding how to manage the address mapping 130 of the storage system 110 in a simpler and more effective way so as to balance workloads of managing various shards.

To solve the above drawbacks, implementations of the present disclosure provide a method, device and computer program product for managing the address mapping 130 of the storage system 110. According to example implementations of the present disclosure, the address mapping 130 may comprise a group of buckets, where a bucket may be associated with an address range in the storage system 110, e.g., may be associated with an address range in a storage device. The number of buckets may depend on the size of storage space in the storage system 110, and a maximum may be set for the number of buckets. For example, the entire storage space in the storage system 110 may be divided into $2^m$ buckets (e.g., where m=7, there are 128 buckets).

Identifiers (e.g., 0 to 127) may be set for the group of buckets, and the data object 140 may be mapped to a corresponding bucket based on its hash value. For example, the hash value of a certain data object is 11, and then the data object may be mapped to the $11^{th}$ bucket. Multiple data objects may be mapped to the same or different buckets. As the storage system 110 runs, the number of data objects included in each bucket will increase. The group of buckets may be divided into a group of shards, e.g., $2^m$ buckets may be divided into n shards. Suppose m=7 and n=3, then 128 buckets may be divided into 3 shards.

Figure 3:
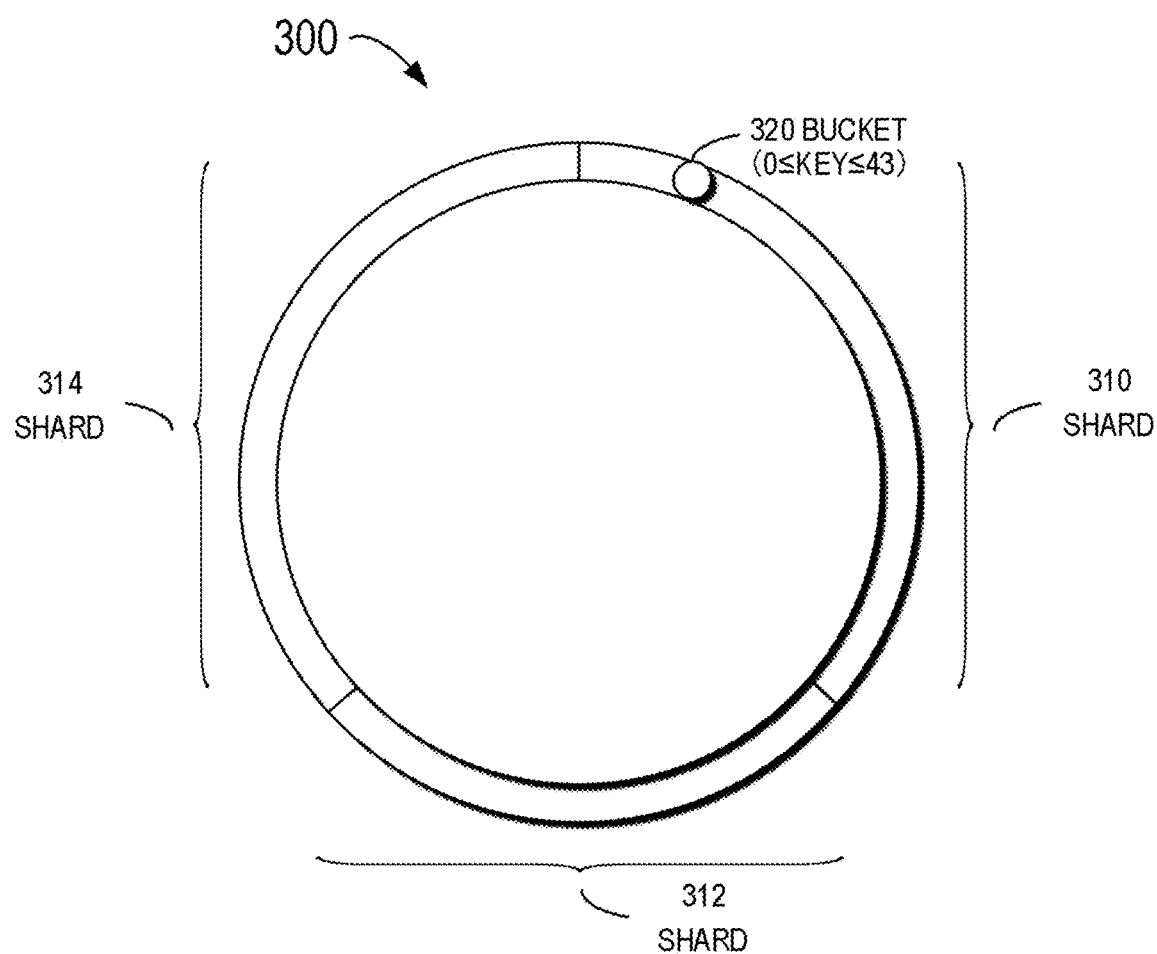
FIG. 3 schematically shows a block diagram for managing an address mapping of a storage system according to one implementation of the present disclosure.

For the sake of description, description is presented below in the context where the data object 140 only comprises one block. When the data object 140 comprises mass data, the data object 140 may be divided into a plurality of blocks. At this point, the processing performed to each block in the data object 140 is similar. FIG. 3 schematically shows a block diagram 300 for managing the address mapping 130 of the storage system 110 according to one implementation. As depicted, a plurality of buckets may be managed in a ring. When divided equally, 128 buckets may be divided into 3 shards. For example, a shard 310 may comprise 0 to $43^{rd}$ buckets, a shard 312 may comprise $44^{th}$ to $86^{th}$ buckets, and a shard 314 may comprise $87^{th}$ to $127^{th}$ buckets. It will be understood here the way of dividing is merely schematic, and buckets may further be divided in other ways.

According to example implementations of the present disclosure, the concept of an active shard is proposed. Here the active shard refers to a shard in the address mapping 130 which can be changed. In other words, the address mapping 130 may be updated by mapping a new data object to a bucket in an active shard. As shown in FIG. 3, after a write request for writing a new data object to the storage system 110 is received, the data object may be mapped to a bucket 320 in the active shard 310 based on its hash value. Besides an active shard, the address mapping 130 may further comprise an inactive shard. Here the inactive shard refers to a shard in the address mapping 130 which cannot be changed. In other words, no new data object can be mapped to a bucket in an inactive shard, but only a query operation can be performed to the inactive shard.

At this point, the storage system 110 may be instructed to store the data object 140 to a first storage device in a group of storage devices, here the first storage device is associated with a first active shard to which a first bucket belongs. Subsequently, the storage system 110 may be managed based on the updated address mapping. More details on how to manage the address mapping 130 of the storage system 110 will be described with reference to FIG. 4.

Figure 4:
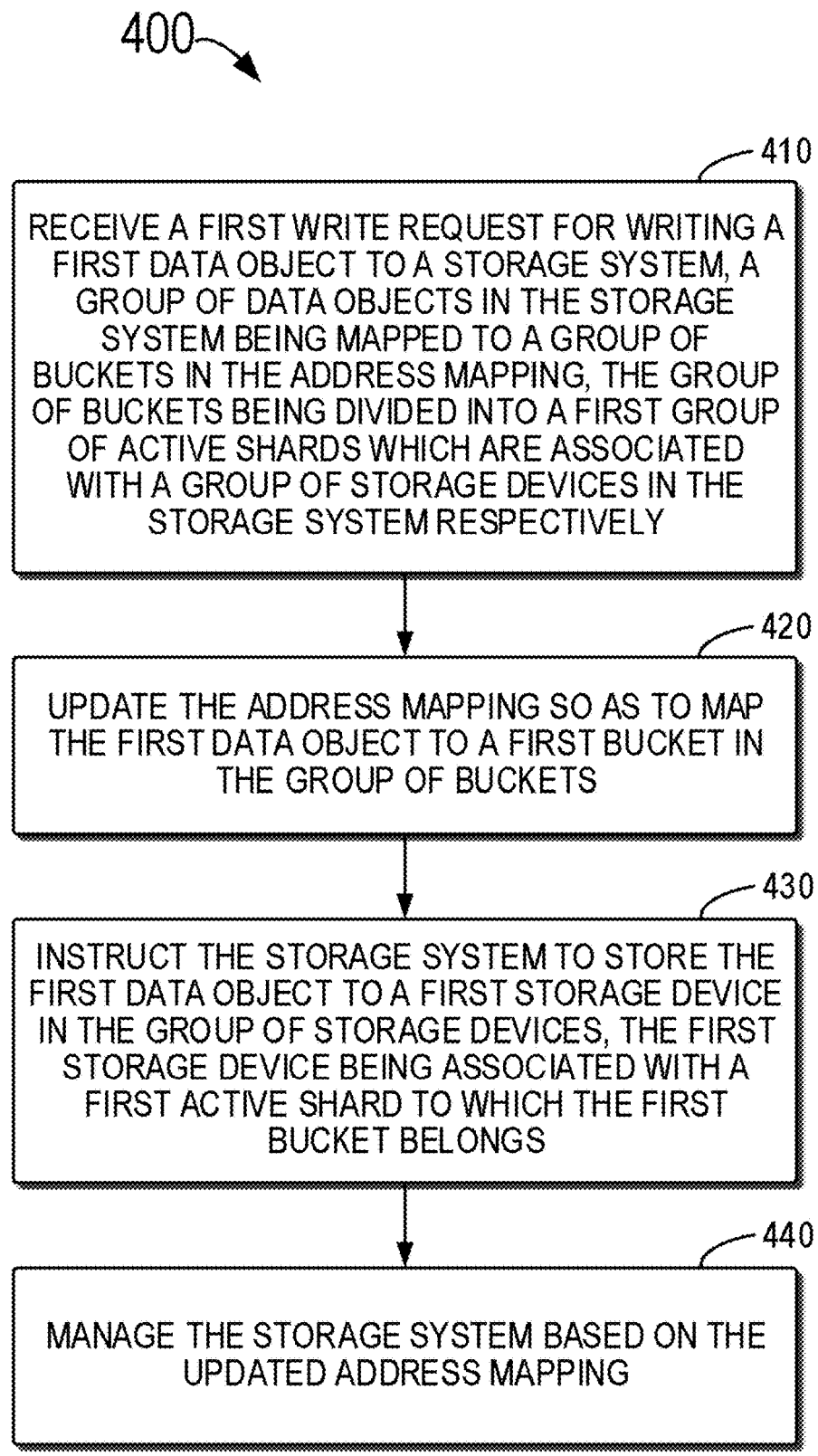
FIG. 4 schematically shows a flowchart of a method for managing an address mapping of a storage system according to one implementation of the present disclosure.

FIG. 4 schematically shows a flowchart of a method 400 for managing the address mapping 130 of the storage system 110 according to one implementation of the present disclosure. It will be understood here a group of data objects in the storage system 110 are mapped to a group of buckets in the address mapping, and the group of buckets are divided into a first group of active shards that are associated with a group of storage devices in the storage system, respectively. As shown by block 410 in FIG. 4, a first write request for writing a first data object to the storage system 110 may be received. Here the first data object is a new data object that is to be written to the storage system. It will be understood an operation with respect to one write request will be described by way of example only. According to example implementations of the present disclosure, the storage system 110 may receive one or more write requests, and at the same time it may receive one or more read requests. At this point, these requests may be served based on different shards in the address mapping: a write request may be served using an active shard, and a read request may be served using both an active shard and an inactive shard.

At block 420, the address mapping 130 may be updated so as to map the first data object to a first bucket in the group of buckets. Here, a hash operation may be performed to the first data object so as to determine a hash value of the first data object. For example, a predetermined hash function may be used, and a hash value 210 may be obtained based on an identifier of the first data object. For another example, a corresponding hash value may be generated based on an identifier of the first data object, a user identifier of an owner, data in the data object and a timestamp, and the like.

At block 430, the storage system 110 may be instructed to store the first data object to a first storage device in the group of storage devices. Here the first storage device is associated with a first active shard to which the first bucket belongs. In other words, information associated with the first data object is written to a bucket of active shards. For example, if the hash value of the first data object is 11, since 0<11<43, the first data object may be stored to a storage device associated with the shard 310. For another example, if the hash value of the first data object is 57, since 44<57<86, the first data object may be stored to a storage device associated with the shard 312. For still another example, if the hash value of the first data object is 93, since 87<93<127, the first data object may be stored to a storage device associated with the shard 314. At this point, all of the shards 310, 312 and 314 in FIG. 3 are active shards.

At block 440, the storage system 110 may be managed based on the updated address mapping 130. It will be understood the updated address mapping 130 already includes information of the first data object which is just stored to the storage system 110. Based on the updated address mapping, it may be determined from which address in the storage system 110 the newly stored data object is read. While the storage system 110 is running, if a write request for writing other data object to the storage system 110 is received, the current address mapping 130 may further be updated, so as to add information of a to-be-written data object to the address mapping 130.

It will be understood during the initial operation stage of the storage system 110, the address mapping 130 may comprise only one group of active shards, and as the storage system 110 runs, buckets in each active shard will involve more and more data objects. Since resources involved in managing shards will increase, other shards may be generated through a regeneration operation, so as to manage a new write operation for writing a new data object to the storage system 110. According to example implementations of the present disclosure, the current first group of active shards may further be converted to inactive shards. Here an inactive shard may be used to manage a read operation for reading a data object from the storage system 110. By means of example implementations of the present disclosure, operations for managing different shards may be assigned to different devices (e.g., may be processed by processors in different storage devices). Therefore, the address mapping 130 may be managed in a more parallel and effective way.

According to example implementations of the present disclosure, if it is determined the state of the storage system 110 meets a predetermined regeneration condition, then the first group of active shards may be identified as a first group of inactive shards. For example, a first generation identifier may be used to represent a generation to which the plurality of active shards belong. Suppose a group of active shards are set during the initial start of the storage system 110, then a corresponding generation identifier (e.g., represented as "Generation01") may be assigned to the group of active shards.

Further, a shard identifier may be assigned to each shard. For example, "Shard01" may be used to represent a first shard, "Shard02" may be used to represent a second shard, and so on and so forth. At this point, for each shard, it may be uniquely represented by a tuple (generation identifier, shard identifier). For example, (Generation01, Shard01) may represent the first shard in the first generation. It will be understood although how to differentiate various generations has been described by taking generation identifiers as an example, according to example implementations of the present disclosure, the differentiation may be based on other methods. For example, the differentiation may be implemented based on a timestamp of a data object.

As the storage system 110 runs, when the predetermined regeneration condition is met, the initial group of active shards may be marked as inactive state, and further a group of active shards may be generated. For example, a generation identifier "Generation02" may be assigned to the newly generated group of active shards. At this point, various shards in the newly generated group of active shards may be represented as (Generation02, Shard01), (Generation 02, Shard 02), (Generation02, Shard03), etc. An identifier may be set for the group of shards that are currently in active state. Alternatively and/or additionally, a group of shards may be defined with the greatest generation identifier that are in active state, while other group(s) of shards with a smaller generation identifier(s) are in inactive state.

While the storage system 110 runs, when the storage system 110 receives a write request, a to-be-written data object may be mapped to a bucket in a current group of active shards and written to a storage device associated with the bucket in the storage system 110. In other words, a group of active shards in the address mapping 130 may be updated, so as to serve the write request. When the storage system 110 receives a read request, all shards (including active shards and inactive ones) in the address mapping 130 may be queried, so as to find a shard associated with a to-be-read data object and further read data from a storage device corresponding to the found shard.

It will be understood with the running of the storage system, more and more data objects will be written to the group of storage devices of the storage system during the operation of the storage system. As a result, each active shard will be involved in more and more data objects. As the number of data objects associated with a shard increases constantly, the number of resources involved in managing the shard will also increase, compounding the complexity of management. According to example implementations of the present disclosure, the predetermined regeneration condition may comprise a threshold count of data objects associated with a shard.

Specifically, during operation of the storage system 110, statistics may be made on the number of data objects involved in each active shard. For example, regarding a given active shard in the first group of active shard, an object count of data objects associated with the given active shard may be determined at predetermined time intervals. Alternatively and/or additionally, statistics may be made every time an active shard is to be updated, or a dedicated counter may be set for each active shard so as to record the number of data objects involved by the active shard. Whether regeneration is performed may be determined depending on the relationship between the object count and the threshold count. If the determined object count is higher than the threshold count, then a regeneration operation may be performed, at which point the current group of active shards may be identified as inactive shards and the group of buckets may be assigned to a new second group of active shards.

Continuing the example in FIG. 3, among the three shards 310, 312 and 314, if the number of data objects involved in the shard 310 is higher than the predetermined threshold count, then a regeneration operation may be performed. Suppose identifiers of the three shards 310, 312 and 314 are (Generation01, Shard01), (Generation01, Shard02) and (Generation01, Shard03), respectively, then a new group of active shards (Generation02, Shard01), (Generation02, Shard01) and (Generation02, Shard03) may be generated. At this point, different processors may be allocated for managing shards in different groups. For example, a processor in the storage device 120 may be allocated for managing shards with the generation identifier of "Generation01," and a processor in the storage device 122 may be allocated for managing shards with the generation identifier of "Generation02." According to example implementations of the present disclosure, different processors may further be allocated for managing different shards with the same generation identifier. With example implementations of the present disclosure, processing resources in the storage system 110 may be put to more efficient use, so as to manage the address 130 of the storage system 110 in a more parallel manner.

It will be understood that the number of data objects involved in shards is merely an example of the regeneration condition. According to example implementations of the present disclosure, the regeneration condition may further involve more examples, as long as the regeneration condition can indicate an indicator associated with processing resources involved in managing the shard. For example, the regeneration condition may comprise the data amount of a data object involved in the shard, the data amount of the shard itself, etc.

It will be understood with the operation of the storage system 110, the frequency of access requests (including read/write requests) received by the storage system 110 may also change constantly. For example, the storage system 110 might frequently receive write requests within a time period, at which point many data objects will be mapped to an active shard. This will rapidly increase workloads of managing the active shard. For another example, the storage system 110 might only receive a few write requests and even no write request within a time period, at which point workloads of managing a certain active shard will be kept at a low level.

In view of the above, according to example implementations of the present disclosure, a threshold load may be set for an active shard. Specifically, the load threshold may indicate a recommended number of requests which may be processed by an active shard within a predetermined time period. The load threshold may comprise an upper threshold and a lower threshold so as to indicate the range of the recommended number. For example, the load threshold may be defined as the range (low, high) of the number of requests which may be processed by an active shard per second. At this point, statistics may first be made on the access load of the storage system 110, and how to adjust the number of active shards may be determined based on the relationship between the access load and the upper threshold, lower threshold.

Figure 5:
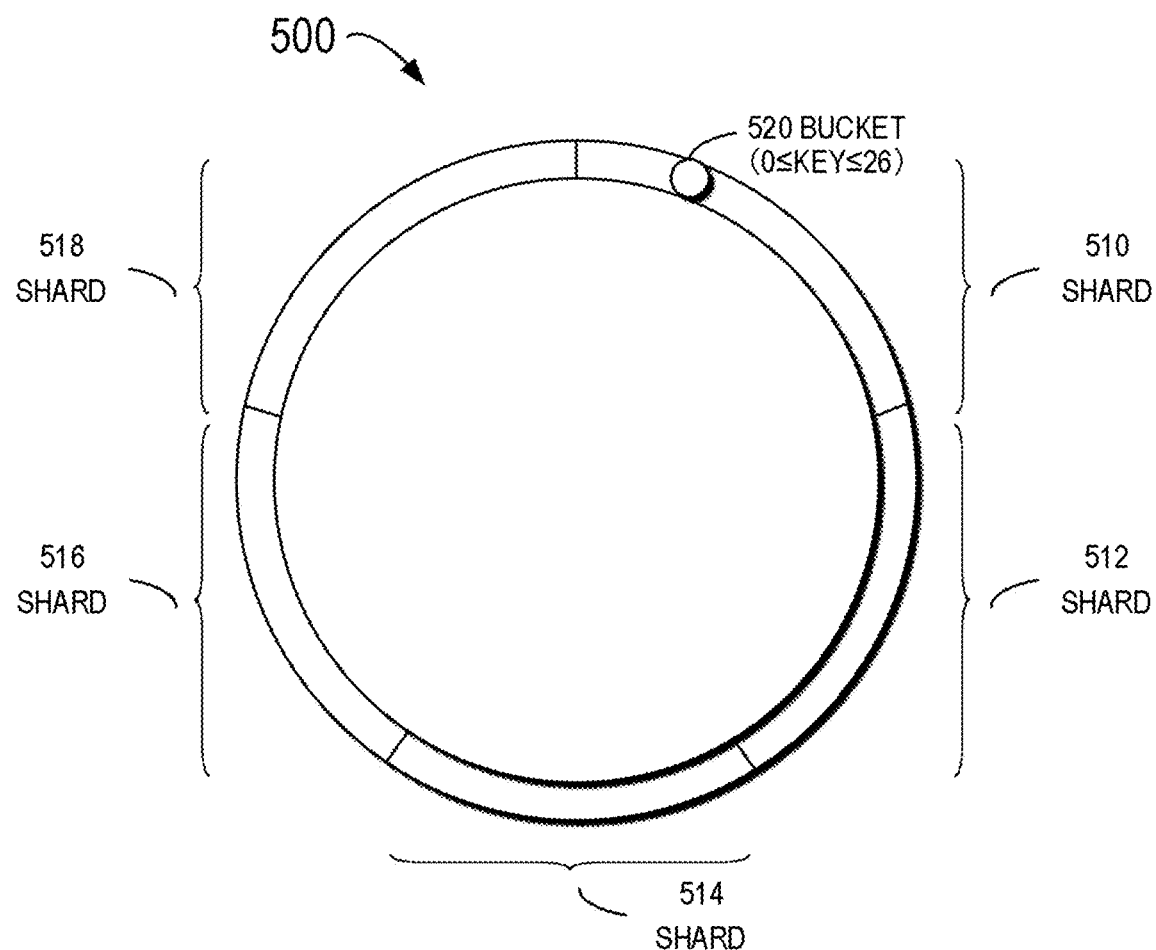
FIG. 5 schematically shows a block diagram of a group of active shards after a shard count is adjusted according to one implementation of the present disclosure.

According to example implementations of the present disclosure, statistics may be made to the number of write requests received by the storage system 110 recently, and the access load of the storage system 110 may be determined based on this number. If the access load is higher than the upper threshold "high," this means a current group of active shards have a higher workload. Therefore, the number of current active shards needs to be increased. For example, the number of current active shards may be progressively increased based on a predetermined step length. According to example implementations of the present disclosure, if the access load of the storage system 110 is lower than the lower threshold "low," this means the current group of active shards have a lower workload. Thus, the number of current active shards needs to be decreased. For example, the number of current active shards may be progressively decreased based on a predetermined step length. With reference to FIG. 5, description is presented below to more details on how to adjust the number of current active shards.

FIG. 5 schematically shows a block diagram 500 of a group of active shards after adjusting the number of shards according to one implementation of the present disclosure. Continuing the example in FIG. 3, if it is determined the workload related to 3 active shards shown in FIG. 3 is relatively high, then the number of active shards may be adjusted. For example, the number of active shards may be adjusted to 5. As shown in FIG. 5, a group of buckets may be divided into 5 active shards: a shard 510 may comprise the $0^{th}$ to $26^{th}$ buckets, a shard 512 may comprise the $27^{th}$ to $52^{nd}$ buckets, and a shard 514 may comprise the $53^{rd}$ to $77^{th}$ buckets, a shard 516 may comprise the $78^{th}$ to $103^{rd}$ buckets, and a shard 518 may comprise the $104^{th}$ to $127^{th}$ buckets. It will be understood although FIG. 5 illustrates an example of adjusting the number of current active shards to 5, according to example implementations of the present disclosure, a target number after the adjustment may be determined based on the relationship between the access load of the storage system 110 and the upper threshold/lower threshold.

According to example implementations of the present disclosure, suppose currently there are N active shards, the range of the number of access requests which may be processed by one active shard is (low, high), and the number of access requests to be processed by the $i^{th}$ shard is $S_i$. When it is determined the access load is relatively high and the number of active shards needs to be increased, the target number $\text{Num}_{high}$ may be determined based on Formula 1:

$$\text{Num}_{high} = \left\lceil \frac{\sum_{i=0}^{N-1} S_i}{\text{high}} \times N \right\rceil \quad \text{Formula 1}$$

In Formula 1, $\text{Num}_{high}$ denotes the number of active shards after the adjustment, N denotes the number of active shards before the adjustment, high denotes the upper limit of access requests which may be processed by one active shard, and $S_i$ denotes the number of access requests to be processed by the $i^{th}$ shard.

Similarly, when it is determined the access load is relatively high and the number of active shards needs to be decreased, the target number $\text{Num}_{low}$ may be determined based on Formula 2:

$$\text{Num}_{low} = \left\lceil \frac{\sum_{i=0}^{N-1} S_i}{\text{low}} \times N \right\rceil \quad \text{Formula 2}$$

In Formula 2, $\text{Num}_{low}$ denotes the number of active shards after the adjustment, N denotes the number of active shards before the adjustment, low denotes the lower limit of access requests which may be processed by one active shard, and $S_i$ denotes the number of access requests to be processed by the $i^{th}$ shard.

With the operation of the storage system 110, the number of active shards may be adjusted to a different value, which might cause smaller shards (referred to as "fragment shards"). Therefore, these fragment shards may be merged so as to form larger shard(s), which facilitates the management of shards in the storage system 110.

According to example implementations of the present disclosure, corresponding data distribution of a plurality of data objects associated with active shards in the first group of active shards is determined. Further, successive active shards in the group of active shards may be merged based on the corresponding data distribution. More details on how to merge fragments will be described with reference to pseudocode shown in Table 1 below.

TABLE 1

Example Operation of Merging Fragments

```
def merge( ):
    sort_by_key(sealed shards);
    iterate through the sorted list:
        current_key_range □ key_range(current_shard);
        subSum □ Sum(current_shard) + subSum;
        subRange = combine_range(current_key_range);
        if subSum > low:
            archived_shard □ archive(subRange, current_shards);
            subSum □ 0;
            subRange □ [ ];
        else if reach the end of list:
            archived_shard □ archive(subRange, current_shards);
    mark merge complete and regenerate
```

Figure 6:
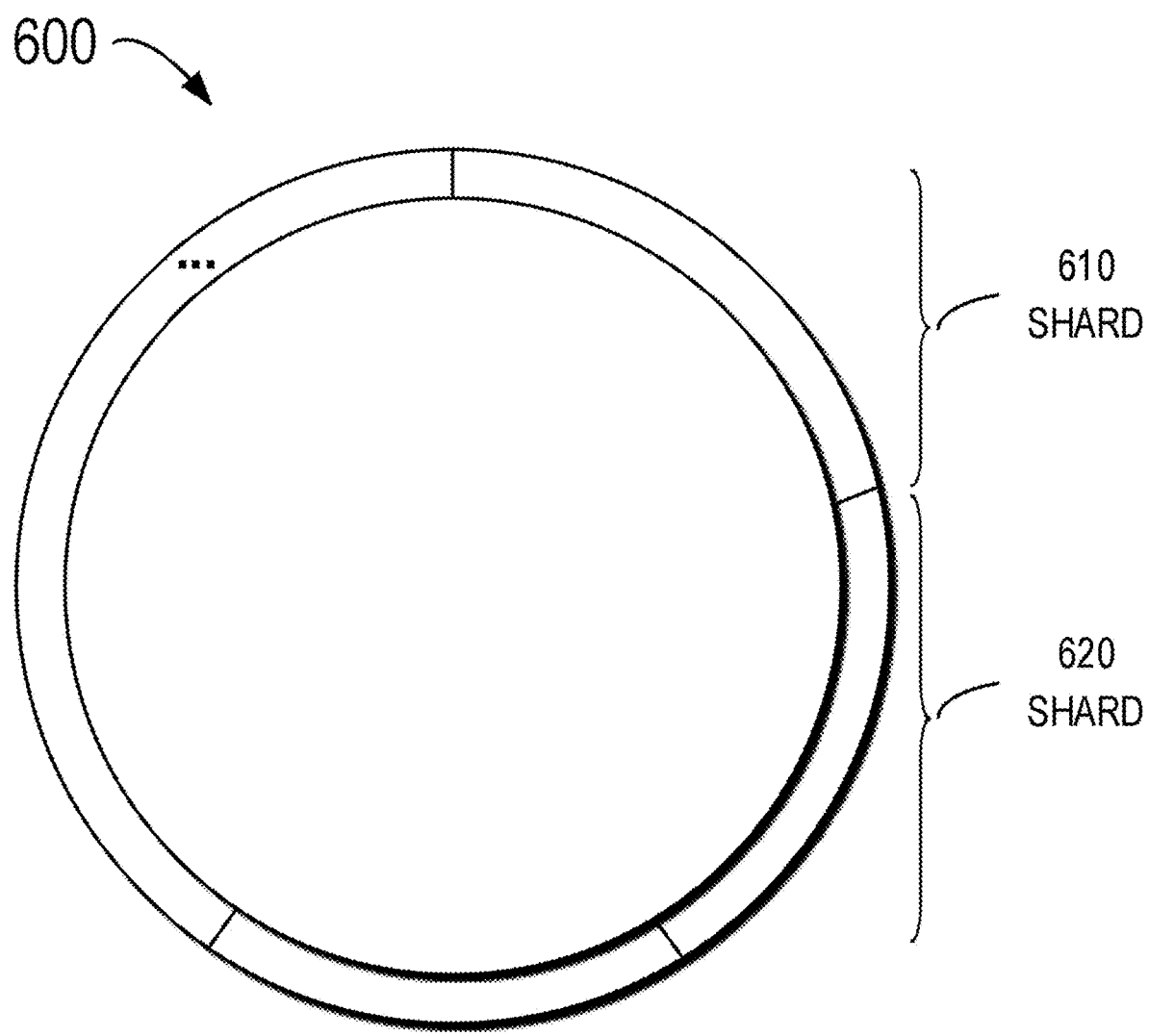
FIG. 6 schematically shows a block diagram for merging a plurality of shards according to one implementation of the present disclosure.

As shown in Table 1 above, fragment shards in the same generation may be sorted according to the distribution on a ring, and then neighboring small shards may be merged into a larger shard close to a target size. More details about the merge will be described with reference to FIG. 6. This figure schematically shows a block diagram 600 for merging a plurality of shards according to one implementation of the present disclosure. As depicted, suppose there exist shards 610, 620, etc., then neighboring shards may be merged into a larger shard based on their distribution on a ring. For example, the shards 610 and 620 may be merged into a larger shard.

According to example implementations of the present disclosure, data objects may be written to the storage system 110 continually. A second write request for writing a second data object to the storage system 110 may be received. The address mapping may be updated so as to map the second data object to a second bucket in the group of buckets. The storage system may be instructed to store the second data object to a second storage device in the group of storage devices, and the second storage device is associated with a second active shard to which the second bucket belongs. Here, the second write request may be processed in a similar way to the method 400 described above.

According to example implementations of the present disclosure, for each stored data object in the storage system 110, a generation identifier of the data object may be stored in the address mapping 130. For example, regarding a specific data object A, when writing the data object A to a storage device in the storage system 110, suppose the data object A is managed using a first-generation active shard, then a generation identifier of the data object A may be "Generation01." In this way, after receiving a read request with respect to the data object A, it is possible to quickly find a generation to which an address mapping of the data object A belongs, and further find corresponding shard information.

Figure 7:
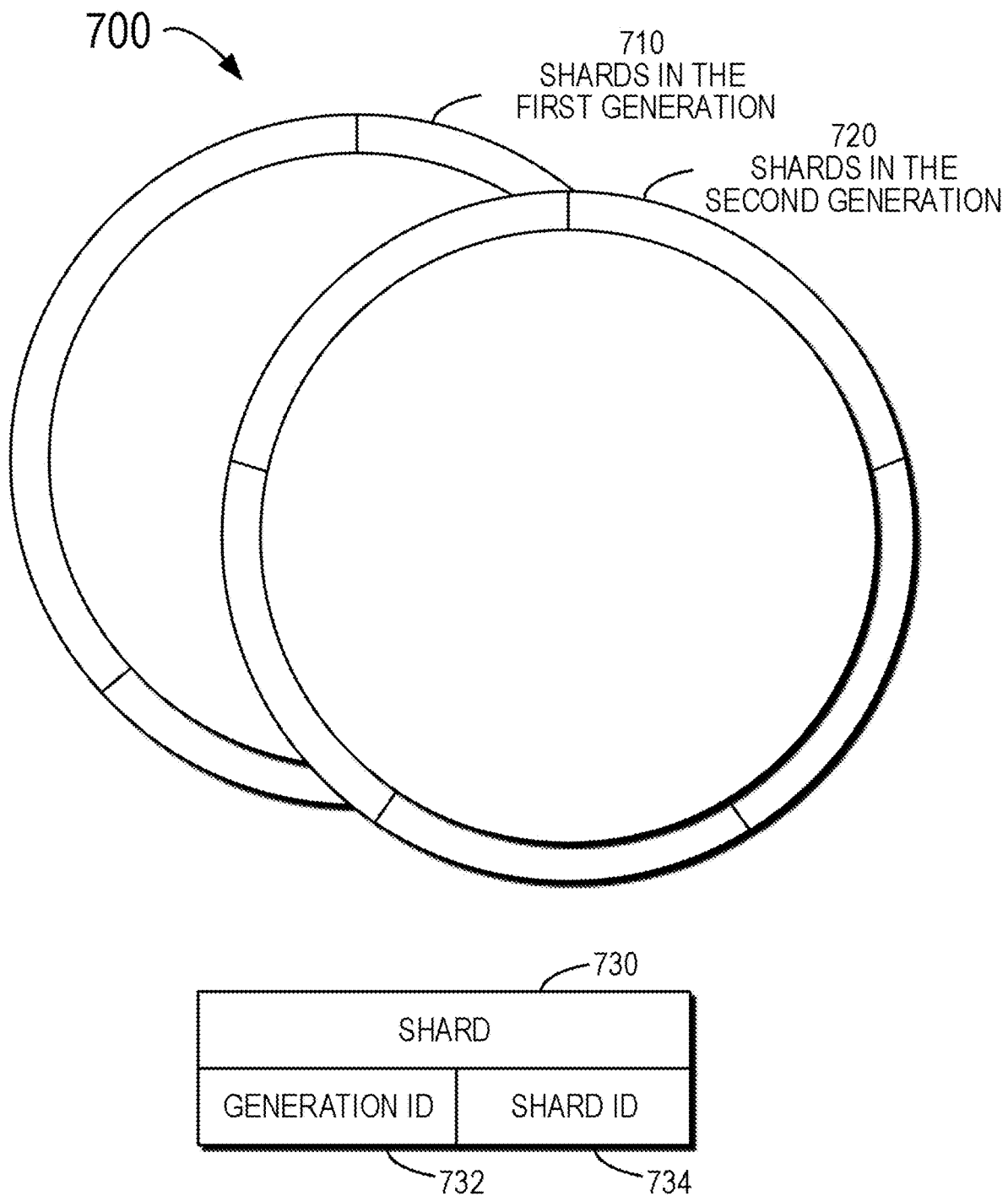
FIG. 7 schematically shows a block diagram of querying a target data object in a storage system according to example implementations of the present disclosure.

It will be understood the address mapping 130 may comprise only one group of active shards and may comprise one or more groups of inactive shards. At this point, active shards are used to serve write requests, and the active shards and the inactive shards are used to serve read requests. Then, the task of managing a plurality of shards may be assigned to different processors. With example implementations of the present disclosure, a plurality of write/read requests may be served in parallel by using a plurality of processors in the storage system as far as possible. With reference to FIG. 7, description is presented below on how to read data from the storage system 110.

FIG. 7 schematically shows a block diagram 700 of reading a target data object from the storage system 110 according to one implementation of the present disclosure. A corresponding identifier may be set for a shard in the same generation according to example implementations of the present disclosure. For example, each shard 730 may be uniquely identified by a generation identifier 732 and a shard identifier 734. At this point, the address mapping 130 may comprise a shard 710 (in activated state) in the first generation and a shard 720 (in deactivated state) in the second generation. It will be understood although FIG. 7 illustrates the circumstance where there are one group of inactive shards and one group of active shards, according to example implementations of the present disclosure, there may further be a plurality of groups of inactive shards and one group of active shards.

According to example implementations of the present disclosure, a read request for reading a target data object from the storage system 110 may be received. A target shard associated with the target data object is determined based on associations in the address mapping 130. The target data object is read from the storage system 110 based on the target shard.

Specifically, after receiving a read request with respect to the storage system 110, a hash value of a data object to be read as specified by the read request may be determined based on an identifier of the data object. Subsequently, a generation to which the data object belongs may be determined first. Suppose a data object with a hash value of 11 belongs to "Generation01," then a shard corresponding to the data object may be looked up in a group of shards with the generation identifier of "Generation01." Next, index information on the data object may be determined based on the found shard, and then the data object may be retrieved from the storage device 110. For another example, suppose a data object with a hash value of 11 belongs to "Generation02," then a shard corresponding to the data object may be looked up in a group of shards with the generation identifier of "Generation02."

While examples of the method 400 according to the present disclosure have been described in detail with reference to FIGS. 2 to 7, description is presented below to the implementation of a corresponding apparatus. According to example implementations of the present disclosure, provided is an apparatus for managing an address mapping of a storage system. A group of data objects in the storage system are mapped to a group of buckets in the address mapping, the group of buckets being divided into a first group of active shards which are associated with a group of storage devices in the storage system, respectively. The apparatus comprises: a receiving module configured to receive a first write request for writing a first data object to the storage system; an updating module configured to update the address mapping so as to map the first data object to a first bucket in the group of buckets; an instructing module configured to instruct the storage system to store the first data object to a first storage device in the group of storage devices, the first storage device being associated with a first active shard to which the first bucket belongs; and a managing module configured to manage the storage system based on the updated address mapping.

According to example implementations of the present disclosure, the managing module comprises: a regenerating module configured to identify the first group of active shards as a first group of inactive shards in response to determining a state of the storage system meeting a predetermined regeneration condition; and a dividing module configured to divide the group of buckets into a second group of active shards.

According to example implementations of the present disclosure, the regeneration condition comprises a threshold count of data objects associated with a shard, and the dividing module further comprises: a determining module configured to, regarding a given active shard in the first group of active shards, determine an object count of data objects associated with the given active shard; and an adjusting module configured to divide the group of buckets into a second group of active shards in response to determining the object count is higher than the threshold count.

According to example implementations of the present disclosure, the apparatus further comprises: a load module configured to adjust a shard count of active shards in the first group of active shards based on an access load of the storage system and a load threshold condition of the storage system.

According to example implementations of the present disclosure, the load threshold condition comprises a lower threshold, and the adjusting module comprises: a decreasing module configured to decrease the shard count in response to determining the access load of the storage system is lower than the lower threshold.

According to example implementations of the present disclosure, the load threshold condition comprises an upper threshold, and the adjusting module comprises: an increasing module configured to increase the shards in response to determining the access load of the storage system is higher than the lower threshold.

According to example implementations of the present disclosure, the managing module comprises: a distribution determining module configured to determine data distribution of a plurality of data objects in the first group of active shards; and a merging module configured to merge successive active shards in the group of active shards based on the data distribution.

According to example implementations of the present disclosure, the receiving module is further configured to receive a second write request for writing a second data object to the storage system; the updating module is further configured to update the address mapping so as to map the second data object to a second bucket in the group of buckets; the instructing module is further configured to instruct the storage system to store the second data object to a second storage device in the group of storage devices, the second storage device being associated with a second active shard to which the second bucket belongs.

According to example implementations of the present disclosure, the managing module comprises: an identifier determining module configured to determine a first generation identifier and a first shard identifier of a first active shard associated with the first data object based on the group of active shards; and an adding module configured to add to the address mapping a first association between the first data object and the first active shard, the first active shard being represented using the first generation identifier and the first shard identifier.

According to example implementations of the present disclosure, the receiving module is further configured to receive a read request for reading a target data object from the storage system; a shard determining module is configured to determine a target shard associated with the target data object based on associations included in the address mapping; and a reading module is configured to read the target data object from the storage system based on the target shard.

Figure 8:
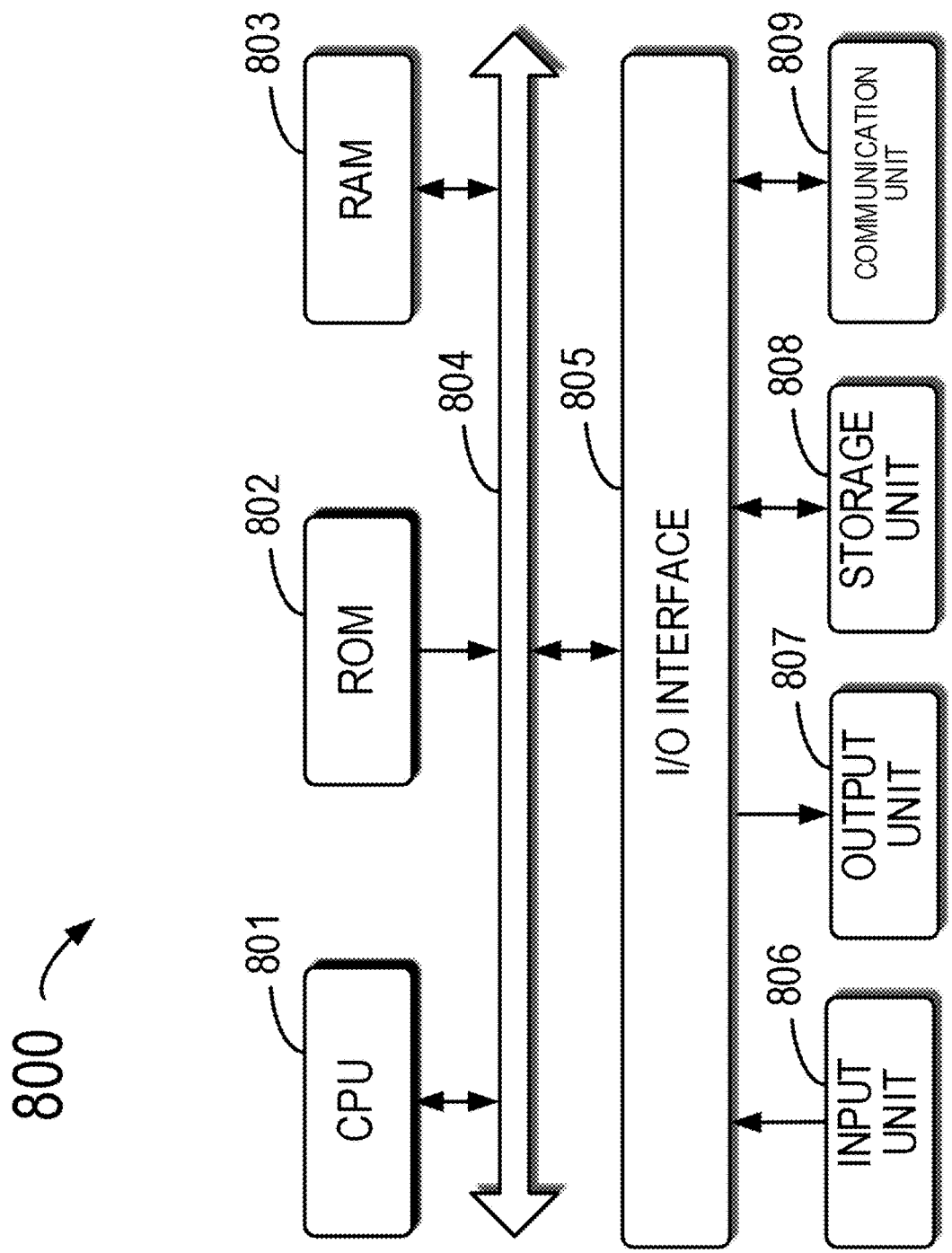
FIG. 8 schematically shows a block diagram of a device for managing an address mapping of a storage system according to example implementations of the present disclosure.

FIG. 8 schematically shows a block diagram of a device 800 for managing an address mapping of a storage system according to example implementations of the present disclosure. As depicted, the device 800 includes a central processing unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operation of the device 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as magnetic disk and optical disk, etc.; and a communication unit 809, such as network card, modem, wireless transceiver and the like. The communication unit 809 allows the device 800 to exchange information/data with other devices via the computer network, such as Internet, and/or various telecommunication networks.

The above described process and treatment, such as the method 400 can also be executed by the processing unit 801. For example, in some implementations, the method 400 can be implemented as a computer software program tangibly included in the machine-readable medium, e.g., the storage unit 808. In some implementations, the computer program can be partially or fully loaded and/or mounted to the device 800 via ROM 802 and/or the communication unit 809. When the computer program is loaded to the RAM 803 and executed by the CPU 801, one or more steps of the above described method 400 can be implemented. Alternatively, in other implementations, the CPU 801 also can be configured in other suitable manners to realize the above procedure/method.

According to example implementations of the present disclosure, there is provided a device for managing an address mapping of a storage system, a group of data objects in the storage system being mapped to a group of buckets in the address mapping, the group of buckets being divided into a first group of active shards which are associated with a group of storage devices in the storage system, respectively. The device comprises: at least one processor; a volatile memory; and a memory coupled to the at least one processor, the memory having instructions stored thereon, the instructions, when executed by the at least one processor, causing the device to perform acts. The acts include: receiving a first write request for writing a first data object to the storage system; updating the address mapping so as to map the first data object to a first bucket in the group of buckets; instructing the storage system to store the first data object to a first storage device in the group of storage devices, the first storage device being associated with a first active shard to which the first bucket belongs; and managing the storage system based on the updated address mapping.

According to example implementations of the present disclosure, managing the storage system based on the updated address mapping comprises: identifying the first group of active shards as a first group of inactive shards in response to determining a state of the storage system meeting a predetermined regeneration condition; and dividing the group of buckets into a second group of active shards.

According to example implementations of the present disclosure, the regeneration condition comprises a threshold count of data objects associated with a shard, and the acts further comprise: regarding a given active shard in the first group of active shards, determining an object count of data objects associated with the given active shard; and dividing the group of buckets into a second group of active shards in response to determining the object count is higher than the threshold count.

According to example implementations of the present disclosure, the acts further comprise: adjusting a shard count of active shards in the first group of active shards based on an access load of the storage system and a load threshold condition of the storage system.

According to example implementations of the present disclosure, the load threshold condition comprises a lower threshold, and adjusting a shard count of active shards in the first group of active shards comprises: decreasing the shard count in response to determining the access load of the storage system is lower than the lower threshold.

According to example implementations of the present disclosure, the load threshold condition comprises an upper threshold, and adjusting a shard count of active shards in the first group of active shards comprises: increasing the shards in response to determining the access load of the storage system is higher than the lower threshold.

According to example implementations of the present disclosure, managing the storage system based on the updated address mapping comprises: determining data distribution of a plurality of data objects in the first group of active shards; and merging successive active shards in the group of active shards based on the data distribution.

According to example implementations of the present disclosure, managing the storage system based on the updated address mapping comprises: receiving a second write request for writing a second data object to the storage system; updating the address mapping so as to map the second data object to a second bucket in the group of buckets; instructing the storage system to store the second data object to a second storage device in the group of storage devices, the second storage device being associated with a second active shard to which the second bucket belongs.

According to example implementations of the present disclosure, managing the storage system based on the updated address mapping comprises: determining a first generation identifier and a first shard identifier of a first active shard associated with the first data object based on the group of active shards; and adding to the address mapping a first association between the first data object and the first active shard, the first active shard being represented using the first generation identifier and the first shard identifier.

According to example implementations of the present disclosure, managing the storage system based on the updated address mapping comprises: receiving a read request for reading a target data object from the storage system; determining a target shard associated with the target data object based on associations included in the address mapping; and reading the target data object from the storage system based on the target shard.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skilled in the art to understand implementations of the present disclosure.

We claim:

1. A method for managing an address mapping of a storage system, a group of data objects in the storage system being mapped to a group of buckets in the address mapping, the group of buckets being divided into a first group of active shards that are associated with a group of storage devices in the storage system, respectively, the method comprising:
receiving a first write request for writing a first data object to the storage system;
adjusting a shard count of active shards in the first group of active shards based on an access load of the storage system and a load threshold condition of the storage system, wherein the load threshold condition comprises an upper threshold, and the adjusting the shard count of active shards in the first group of active shards comprises increasing the shard count in response to determining that the access load of the storage system is higher than a lower threshold less than the upper threshold;

updating the address mapping so as to map the first data object to a first bucket in the group of buckets, resulting in an updated address mapping;

instructing the storage system to store the first data object to a first storage device in the group of storage devices, the first storage device being associated with a first active shard to which the first bucket belongs; and managing the storage system based on the updated address mapping.

2. The method of claim 1, wherein the managing the storage system based on the updated address mapping comprises: in response to determining a state of the storage system meeting a predetermined regeneration condition, identifying the first group of active shards as a first group of inactive shards; and dividing the group of buckets into a second group of active shards.

3. The method of claim 2, wherein the predetermined regeneration condition comprises a threshold count of data objects associated with a shard, and the method further comprises:

regarding a given active shard in the first group of active shards, determining an object count of data objects associated with the given active shard; and dividing the group of buckets into the second group of active shards in response to determining the object count is higher than the threshold count.

4. The method of claim 1, wherein the load threshold condition comprises the lower threshold, and the adjusting the shard count of active shards in the first group of active shards comprises:

decreasing the shard count in response to determining the access load of the storage system is lower than the lower threshold.

5. The method of claim 1, wherein the managing the storage system based on the updated address mapping comprises:

determining data distribution of a plurality of data objects in the first group of active shards; and merging successive active shards in the first group of active shards based on the data distribution.

6. The method of claim 2, wherein the managing the storage system based on the updated address mapping comprises:

receiving a second write request for writing a second data object to the storage system;

updating the address mapping so as to map the second data object to a second bucket in the group of buckets; and instructing the storage system to store the second data object to a second storage device in the group of storage devices, the second storage device being associated with a second active shard to which the second bucket belongs.

7. The method of claim 1, wherein the managing the storage system based on the updated address mapping comprises:

determining a first generation identifier and a first shard identifier of the first active shard associated with the first data object based on the group of active shards; and adding to the address mapping a first association between the first data object and the first active shard, the first active shard being represented using the first generation identifier and the first shard identifier.

8. The method of claim 7, wherein the managing the storage system based on the updated address mapping comprises:

receiving a read request for reading a target data object from the storage system;

determining a target shard associated with the target data object based on associations included in the address mapping; and reading the target data object from the storage system based on the target shard.

9. A device for managing an address mapping of a storage system, a group of data objects in the storage system being mapped to a group of buckets in the address mapping, the group of buckets being divided into a first group of active shards which are associated with a group of storage devices in the storage system, respectively, the device comprising:

at least one processor;

a volatile memory; and a memory coupled to the at least one processor and having instructions stored thereon, the instructions, when executed by the at least one processor, causing the device to perform acts comprising:

receiving a first write request for writing a first data object to the storage system;

adjusting a shard count of active shards in the first group of active shards based on an access load of the storage system and a load threshold condition of the storage system, wherein the load threshold condition comprises an upper threshold, and the adjusting the shard count of active shards in the first group of active shards comprises increasing the shard count in response to determining that the access load of the storage system is higher than a lower threshold;

updating the address mapping so as to map the first data object to a first bucket in the group of buckets, resulting in an updated address mapping;

instructing the storage system to store the first data object to a first storage device in the group of storage devices, the first storage device being associated with a first active shard to which the first bucket belongs; and managing the storage system based on the updated address mapping.

10. The device of claim 9, wherein the managing the storage system based on the updated address mapping comprises: in response to determining a state of the storage system meeting a predetermined regeneration condition, identifying the first group of active shards as a first group of inactive shards; and dividing the group of buckets into a second group of active shards.

11. The device of claim 10, wherein the predetermined regeneration condition comprises a threshold count of data objects associated with a shard, and the acts further comprise:

regarding a given active shard in the first group of active shards, determining an object count of data objects associated with the given active shard; and dividing the group of buckets into a second group of active shards in response to determining the object count is higher than the threshold count.

12. The device of claim 9, wherein the load threshold condition comprises the lower threshold, and the adjusting the shard count of active shards in the first group of active shards comprises:

decreasing the shard count in response to determining the access load of the storage system is lower than the lower threshold.

13. The device of claim 9, wherein the managing the storage system based on the updated address mapping comprises:
  determining a data distribution of a plurality of data objects in the first group of active shards; and
  merging successive active shards in the first group of active shards based on the data distribution.

14. The device of claim 10, wherein the managing the storage system based on the updated address mapping comprises:
  receiving a second write request for writing a second data object to the storage system;
  updating the address mapping so as to map the second data object to a second bucket in the group of buckets; and
  instructing the storage system to store the second data object to a second storage device in the group of storage devices, the second storage device being associated with a second active shard to which the second bucket belongs.

15. The device of claim 9, wherein the managing the storage system based on the updated address mapping comprises:
  determining a first generation identifier and a first shard identifier of the first active shard associated with the first data object based on the group of active shards; and
  adding to the address mapping a first association between the first data object and the first active shard, the first active shard being represented using the first generation identifier and the first shard identifier.

16. A computer program product, tangibly stored on a non-transitory computer readable medium and comprising machine executable instructions, which are used to perform operations to manage an address mapping of a storage system, wherein a group of data objects in the storage system are mapped to a group of buckets in the address mapping, and wherein the group of buckets are divided into a first group of active shards that are associated with a group of storage devices in the storage system, respectively, the operations comprising:
  receiving a first write request for writing a data object to the storage system;
  adjusting a shard count of active shards in the first group of active shards based on an access load of the storage system and a load threshold condition of the storage system, wherein the load threshold condition comprises an upper threshold, and the adjusting the shard count of active shards in the first group of active shards comprises increasing the shard count in response to determining that the access load of the storage system is higher than a lower threshold;
  updating the address mapping so as to map the data object to a bucket in the group of buckets, resulting in an updated address mapping;
  instructing the storage system to store the data object to a storage device in the group of storage devices, the storage device being associated with an active shard to which the bucket belongs; and
  managing the storage system based on the updated address mapping.

17. The computer program product of claim 16, wherein the managing the storage system based on the updated address mapping comprises: in response to determining a state of the storage system meeting a predetermined regeneration condition,
  identifying the first group of active shards as a first group of inactive shards; and
  dividing the group of buckets into a second group of active shards.

18. The computer program product of claim 17, wherein the predetermined regeneration condition comprises a threshold count of data objects associated with a shard, and the acts further comprise:
  regarding a given active shard in the first group of active shards, determining an object count of data objects associated with the given active shard; and
  dividing the group of buckets into a second group of active shards in response to determining the object count is higher than the threshold count.

19. The computer program product of claim 16, wherein the load threshold condition comprises the lower threshold, and the adjusting the shard count of active shards in the first group of active shards comprises:
  decreasing the shard count in response to determining the access load of the storage system is lower than the lower threshold.

20. The computer program product of claim 16, wherein the managing the storage system based on the updated address mapping comprises:
  determining a data distribution of a plurality of data objects in the first group of active shards; and
  merging successive active shards in the first group of active shards based on the data distribution.

* * * * *